United States Patent Office 3,407,080
Patented Oct. 22, 1968

3,407,080
LOW DENSITY DRIED AGGLOMERATED FOODS INCLUDING POTATOES AND PROCESS FOR THEIR PRODUCTION
Joe H. Rainwater, Roderick G. Beck, and Lyle H. Parks, Blackfoot, Idaho, assignors to American Potato Company
No Drawing. Continuation-in-part of application Ser. No. 411,118, Nov. 13, 1964. This application Oct. 13, 1965, Ser. No. 495,696
8 Claims. (Cl. 99—207)

ABSTRACT OF THE DISCLOSURE

This invention relates to low-density dried food products and a process for making them. More particularly, it relates to the unique food product made by the novel process of foaming a slurry containing food solids, extruding the foam to foam discrete pieces of foam, coating the extruded foam pieces with dry particles of the same or different food solids and drying the coated pieces to produce the final product which, in appearance and texture, is a porous nugget.

This application is a continuation-in-part of our earlier application, similarly entitled, Ser. No. 411,118, filed Nov. 13, 1964 and abandoned on Nov. 15, 1967.

THE PRIOR ART

There are many prior art processes for making low-density food products. Breakfast foods, for instance, are produced by submitting the pieces of food to a high temperature and pressure and suddenly lowering the pressure. The rapidly expanding steam inside the piece puffs the food up. The traditional baking process expands the food piece more slowly by the action of evolved gases.

None of these processes is entirely suitable for handling food products which are sensitive to high temperature. For instance, sugar caramelizes and onion enzymes break down preventing the formation of flavor. Our foam process however does not depend on high temperatures for drying of the foamed ingredients and therefore these ingredients may be incorporated into the final product without altering their natural taste.

Furthermore, the prior art processes do not make an expanded potato product which rapidly rehydrates to a mashed potato. The reason is that an expanded potato make by those processes will have its cells too firmly attached to each other to separate without rupturing when dry and without separating will not rapidly rehydrate.

Dried foods have also been produced by foaming a slurry and drying the foam on a perforated tray with hot air. It has been used to dry heat sensitive foods such as tomato paste. The dried product is extremely light and fragile. It is ground down to a powder in which form it is sold.

In our process wet foam pieces are coated with dry food particles. The dry coating draws the moisture to the outer shell, carrying the food solids from the foam with it, eliminating the foam lattice, and creating voids within the nugget which is formed. Thus, coating the foam makes the final product both more dense and considerably less fragile than foam dried directly. Both of these attributes are desirable to the commercial production of stable low-density food products.

SPECIFIC EXAMPLE

The invention may be more clearly understood by a detailed disclosure of the process as used to make a low-density, dry instant mashed potato product.

A damage-free potato slurry of about 15%–18% solids is first produced. Such a slurry may be produced directly from cooked potatoes according to the method disclosed in United States patent application Ser. No. 222,538. This slurry is homogenized and aerated to form a stable foam in a commercial machine such as an Oakes mixer using a monoglyceride stabilizer such as Myverol 1807 at a concentration of about 2% based on potato solids. The foam density should be about 0.60 g./ml. This foam is then extruded through a .010 inch thick plate with ³⁄₃₂ inch orifice holes into a fluidized bed of dehydrated potato granules maintained at about 140–160° F. The granules may be the well-known product of the "add-back" process now in large-scale commercial use and consist of almost entirely undamaged potato cells, dried to about 10% moisture or less and existing in the form of single detached cells or a minor fraction of clumps of a small number of cells. The granules average about 75–150 microns in size and coat the foam pieces which form as the foam drops onto the granule bed. After the pieces are formed and partially dried in the fluidized bed, they may be finish dried in the fluid bed or separated by screening from the fluid bed material and finish dried separately. Finish drying may be conducted with 175–225° F. air. The finished low-density nuggets consist of about 25–35% solids from the foam and 75–65% solids from the granule bed.

In appearance the nugget is relatively fragile, porous, and has a rough exterior formed by the visible potato cells and agglomerates. The center has one or more large voids depending on how much the walls of the particle have collapsed during drying.

The finished nugget of the above conditions is mostly −3+16 mesh with a density of about 0.25 g./ml. and is more easily used by the housewife in preparing mashed potatoes than are standard potato granules which have a density of about 0.9 g./ml.

When potato granules are rehydrated, it is necessary to add them while stirring into several volumes of liquid. Continuous stirring is required because the granules must be thoroughly wetted before appreciable swelling occurs. If this is not carefully conducted, dry balls of granules can be present in the mesh. With this nugget form of instant mashed potato, however, the proper amount of hot liquid just covers the particles and the large voids allow all of the cells to be wet rapidly. The result is that the proper amount of water may be easily determined and the product needs little or no stirring or whipping to rehydrate to an excellent mashed potato.

Although we prefer to make the potato slurry for foaming from freshly cooked potatoes, it could be made satisfactorily from any dried potato product from which a slurry or damage-free potato cells can be produced.

We have also found that the physical characteristics of the dried potato can be controlled within wide limits by controlling the solids content and density of the foam, by selecting an appropriate orifice size and shape and the orifice plate thickness of the extruder, and by regulating the temperature of the fluidized potato granule bed.

For example, for a given foam the density of the finished nugget varies inversely with the temperature of the granules. Aslo, we have found that the size of the nugget increases as the foam density increases. The size of the nugget varies directly with orifice size and inversely with the extrustion pressure. The thickness of the orifice plate is quite critical. We have found that the density of the nugget varies directly with the orifice plate thickness.

The following examples outline some of the other novel products we have produced:

Example I (1) Add 309 grams commercial powdered onion to 400 milliliters cold water in a Hobart mixer bowl.

(2) Mix 6 gramts Myverol with 173 milliliters of 140° F. water.

(3) Mix the above with a wire whip at high speed to form a stable foam of desired density, e.g. 0.25 g./ml. after 6 minute whip.

4. Extrude the foam through 3/32 inch orifices into a bed of fluidizing potato granules maintained at 140° F. by submerged steam coils. The air flow used to create the fluid condition and to remove the moisture from the coated foam particles was about 25 ft./min. The onion nuggets were separated by sieving when the mositure content reached 4.0%.

Using several densities and one sample where an unfoamed slurry was extruded, low density onion nuggets coated with potato granules were produced with the following characteristics:

| Sample | Foam Solids, percent | Percent Myverol | Foam Density | Dry Density | Percent Onion |
|---|---|---|---|---|---|
| 1 | 40 | 0 | 1.0 (slurry) | 0.4 | 61 |
| 2 | 35 | 2 | 0.25 | 0.285 | 22 |
| 3 | 35 | 2 | 0.37 | 0.27 | 24 |
| 4 | 35 | 2 | 0.61 | 0.303 | 38 |
| 5 | 35 | 2 | 0.45 | 0.333 | 27 |

Example II (1) Mix 412 grams of commercial powdered garlic and 322 grams of cold water in a Hobart mixing bowl.

(2) Mix 6 grams Myverol with 66 milliliters of 140° F. water.

(3) Mix the above and whip at high speed to desired foam density, e.g., 0.32 g./ml. in 6 minutes.

(4) Extrude garlic foam into a fluidizing bed of potato granules maintained at 140° F.

(5) Dry and separate as in Example I.

Characteristics of the dried product were as follows:

|  | Percent |
|---|---|
| Foam solids | 50 |
| Myverol | 1.5 |
| Dry density | 0.241 |
| Foam density | 0.32 |
| Garlic | 43 |

The above tests in the above two examples demonstrated that we could control composition, density and particle size by controlling foam solids and foam density by the use of monoglyceride emulsifier. Potato granules have a density of about 0.90 g./ml.; powdered onion has a density of about 0.60 g./ml.; powdered garlic has a density of about 0.72 g./ml.

Example III (1) A cereal dough was prepared as follows: Corn cones, 30%; oat flour, 30%; whole wheat flour, 25%; cane sugar, 7%; shortening, 5%; sodium acid pyrophosphate, 0.3%; baking soda, 0.3%; Drewmulse emulsifier, 2.0%; salt, 0.3%. Sufficient water was added to give 50% moisture content and the mix was cooked at 250° F. and for 1¾ hours.

(2) The cooked dough was then drum dried and pulverized to form a precooked cereal powder.

(3) A stable foam was made from a portion of the powder by adding Myverol and water to bring the moisture content to 80%. The mix was whipped in a Hobart mixer for 6½ minutes at high speed to form a stable foam.

(4) The foam was extruded in shape desired into a fluidized bed of the above-prepared cereal powder, and dried as in previous examples.

The finished dry nuggets had a density of only .235 and consisted of porous shells with a substantially hollow interior. Such nuggets are comparable to puffed cereals which are produced normally in batch processes using expensive high pressure guns.

Example IV

Fruit nuggets were prepared by extruding fruit foams into fluidizing beds of fruit powders. The powders were purchased commercially or were drum dried from purees. The fruit foams were made from fresh fruit, puree, or by reconstituting fruit powders. Usually 1–2% Myverol was adequate to produce a stable foam. Best results were obtained by drying only partially in the fluidized bed, followed by separation of the frut nuggets and finish drying in hot air. The finished nuggets had the following densities.

| | Density, g./ml. |
|---|---|
| Apple nuggets | 0.37 |
| Apricot nuggets | 0.345 |
| Peach nuggets | 0.29 |

Example V

Cereal-coated fruit nuggets were produced using the fruit foam of Example IV and a fluidizing bed of cereal powder as used in Example III. Cereal-coated apricot nuggets with a density of 0.193 g./ml. and cereal-coated peach nuggets with a density of 0.20 g./ml. were produced.

Example VI

Fruit-coated cereal nuggets were made by foaming the dry cereal of Example III and extruding the foam into fluidizing beds of apricot and peach powder. The nugget density was 0.4 g./ml. for the apricot and 0.37 g./ml. for the peach.

The above examples represent just a few of the unlimited number of new low density food products which can be made by our process. The nugget composition can be varied in addition to the examples given by using such edible solids as sugar, salt, spices, flavorings, and seasonings as all or part of the fluidizing solid, or by using some such relatively inert or bland edible substance as methyl cellulose; starch, gums, or binders to make the stable foam. In producing snack items salt, spice, glutamate, bacon, cheese, and the like may be added into the foam or used in the coating particles. It is also obvious that a processing step such as toasting, can be conducted in the high temperature fluid bed or in a separate piece of equipment after partial or complete moisture reduction.

The density values given in the above Examples I–VI are for the range of pieces which pass a standard 3 mesh screen but fail to pass a standard 16 mesh screen. Particles smaller than this but larger than the largest particles used in the fluidizing bed have the same porous, substantially hollow configurations as the generally preferred larger pieces. For example, the potato nuggets which pass a 16 mesh screen and are retained on a 20 mesh screen have a density of about 0.4 and possess the same advantages when reconstituted to mashed potatoes.

The construction of a two-or-more-component nugget allows a choice. For example, a cereal-fruit nugget could have the fruit component either on the exterior or in the interior.

An obvious advantage of having the interior composed of fruit is that the foam can be made from fresh fruit in season or from puree. This approach, however, disguises the fruit component which is not visible. The use of an approved appropriate food coloring in the cereal coating would improve the situation. If the fruit component is on the exterior, a dried fruit powder must be produced.

Often such products have been heat damaged in manufacture; furthermore, wide selections are not available. Since many dried fruits are hydroscopic, an edible protective film such as a fat derivative or starch could be applied to preserve crispness.

To one skilled in the art, well-known techniques to improve the quality of nuggets containing heat-sensitive ingredients can be incorporated with our process. For example, dehydrated air could be used in the drying steps to maintain drying rates at lower, less damaging drying temperatures, or vacuum could be applied to the top of the fluidizing bed or to the final dryers to keep product temperatures low to prevent color or flavor changes.

It should be understood that the fluidized bed drier referred to in this application is "fluidized" in the sense described in "Fluidization" by Prof. Othmer, Reinhold Publishing Co. (1956), rather than as defined in Webster (Third International Dictionary, 1963).

We claim:

1. A process for producing dry low density nuggets of particles of food solids comprising forming discrete pieces of a stable foam containing food solids in a liquid medium, coating the exterior of said pieces with absorptive dry particles of food solids, and drying the coated pieces.

2. The process of claim 1 in which the foam is added to a fluidized bed of dry particles.

3. The process of claim 1 in which the bed is fluidized by hot gases whereby the foam is both coated and dried.

4. The process of claim 3 in which the foam is produced from a potato slurry and the dry particles are substantially intact potato cells.

5. The process of claim 1 in which a foam of one product is coated by dry particles of another product.

6. The process of claim 1 in which the foam is produced from cereal particles and the dry particles are fruit powders.

7. The product produced according to the process of claim 1.

8. A dehydrated potato product produced according to the process of claim 1 consisting of nuggets of potato particles, each nugget consisting of a porous shell of agglomerated particles and having an irregular outer surface and a substantially hollow interior.

References Cited

UNITED STATES PATENTS

| | | |
|---|---|---|
| 1,155,977 | 10/1915 | Vernon. |
| 2,015,258 | 9/1935 | Clickner _____ 99—117 |
| 3,031,313 | 4/1962 | Morgan et al. |
| 3,231,695 | 5/1966 | Gidlow et al. |
| 3,388,724 | 8/1967 | Adler et al. _____ 99—207 |

LIONEL M. SHAPIRO, *Primary Examiner.*

D. M. NAFF, *Assistant Examiner.*